United States Patent [19]

Elliott et al.

[11] Patent Number: 5,039,645

[45] Date of Patent: Aug. 13, 1991

[54] CEMENT-CONTAINING CATALYST COMPOSITION AND PROCESS FOR ITS PREPARATION

[75] Inventors: David J. Elliott, Bartlesville, Okla.; Patricia A. Tooley, Camden, Tenn.

[73] Assignee: Phillips Petroleum Company, Bartlesville, Okla.

[21] Appl. No.: 552,286

[22] Filed: Jul. 12, 1990

[51] Int. Cl.$^5$ .......................... B01J 21/06; B01J 23/42; B01J 23/44; B01J 23/89

[52] U.S. Cl. .................................. 502/217; 502/242; 502/247; 502/250; 502/251; 502/327

[58] Field of Search ............... 502/217, 250, 327, 242, 502/247, 251

[56] References Cited

U.S. PATENT DOCUMENTS

| | | | |
|---|---|---|---|
| Re. 31,719 | 10/1984 | Sonetaka et al. | 502/63 |
| 4,211,672 | 7/1980 | Sonetaka et al. | 502/327 X |
| 4,212,854 | 7/1980 | Maki et al. | 423/247 |
| 4,350,613 | 9/1982 | Nishino et al. | 252/455 R |
| 4,818,745 | 4/1989 | Kolts | 502/327 |
| 4,902,660 | 2/1990 | Delzer et al. | 502/174 |
| 4,920,088 | 4/1990 | Kolts | 502/326 |
| 4,921,830 | 5/1990 | Kolts | 502/326 |
| 4,943,550 | 7/1990 | Kolts et al. | 502/327 |

OTHER PUBLICATIONS

"The Chemistry of Portland Cement" by Robert H. Bogue, Reinhold Publishing Corporation, 1947, pp. 265–272.

Kirk–Othmer "Encyclopedia of Chemical Technology", vol. 5, Third Edition, John Wiley and Sons, 1979, pp. 163–193.

1988 Annual Book of ASTM Standards, Section 4, ASTM Procedure C 150–186, pp. 116–120.

"Specification for Materials and Testing of Well Cements", API Specification 10, Fourth Edition, 1988, American Petroleum Institute.

*Primary Examiner*—W. J. Shine
*Attorney, Agent, or Firm*—K. K. Brandes

[57] ABSTRACT

A solid composition is prepared by mixing water, a hydraulic cement, aluminum metal powder, and a catalyst composition comprising (a) an inorganic support, (b) Pt and/or Pd metal (c) and Fe metal and/or oxide, followed by maintaining the obtained mixture under such conditions as to affect hardening of the hydraulic cement. Preferably, the hydraulic cement is a Type III portland cement and/or a Class H well cement. The thus-prepared solid compositon can be used as a CO oxidation catalyst.

20 Claims, No Drawings

1

CEMENT-CONTAINING CATALYST COMPOSITION AND PROCESS FOR ITS PREPARATION

BACKGROUND OF THE INVENTION

In one aspect, this invention relates to a process for preparing a cement-containing composition. In another aspect, this invention relates to a cement-containing composition which is active as a CO oxidation catalyst.

The use of catalysts for the oxidation of carbon monoxide to carbon dioxide by reaction with oxygen, in particular at low temperature, is of much interest, e.g., in $CO_2$ lasers for combining CO and $O_2$ formed by dissociation of $CO_2$ during discharge. In the latter application, the presence of $O_2$ is most undesirable because it can cause a breakdown of the electrical field in the laser cavity. Several patents, such as U.S. Pat. Nos. 4,818,745; 4,902,660; 4,920,088 and 4,921,830 disclose compositions useful as CO oxidation catalysts in $CO_2$ laser applications. However, there is an ever present need to develop new, effective CO oxidation catalyst compositions having high particle strength and high abrasion resistance, and to develop improved processes for preparing effective CO oxidation catalyst compositions.

SUMMARY OF THE INVENTION

It is an object of this invention to provide a process for preparing a cement-containing composition. It is another object of this invention to provide a process for preparing a cement-containing catalyst composition which is effective as a catalyst for converting carbon monoxide and free oxygen to carbon dioxide. It is a further object of this invention to provide a cement-containing catalyst composition. Other objects and advantages will be apparent from the detailed description and the appended claims.

In accordance with this invention, a process for preparing a solid composition of matter which comprises, a mixture of (1) a hardened hydraulic cement and
(2) a catalyst composition comprising (preferably consisting essentially of)
(a) an inorganic support material, preferably at least one of alumina, magnesia, magnesium aluminate ($MgAl_2O_4$), hydrotalcite, silica, titania, zirconia, vanadia and combinations thereof,
(b) at least one of platinum and palladium metal, and
(c) at least one iron component selected from iron oxide, iron metal and mixtures thereof;

wherein said process comprises the steps of:

(A) mixing water, a hydraulic cement, aluminum metal powder, and a catalyst composition comprising components (a), (b) and (c), as defined above; and
(B) maintaining the mixture obtained in step (A) under such conditions so as to affect hardening (setting) of the hydraulic cement, and to substantially dry the mixture of step (A) so as to obtain a substantially dry, solid composition of matter (preferably being active as a catalyst for the conversion of carbon monoxide and oxygen to carbon dioxide at about 10°–50° C.).

In a preferred embodiment, the inorganic support material of the catalyst composition is titania. In another preferred embodiment, the noble metal component (b) of the catalyst composition is platinum. In a further preferred embodiment, component (c) of the catalyst composition consists essentially of iron oxide.

In still another preferred embodiment, the hydraulic cement is a Type III portland cement, as defined in ASTM Method C 150-86 (1988 Annual Book of ASTM Standards, Section 4, Volume 04.01, pages 116–120).

In a still further preferred embodiment, the hydraulic cement is a Class H well cement, as defined in API Specification 10, entitled "Specification for Materials and Testing for Well Cements", Aug. 1, 1988, American Petroleum Institute.

Also in accordance with this invention, there is provided a composition of matter prepared by the process of this invention (described above), preferably being active a catalyst for the oxidation of CO with $O_2$ to $CO_2$, at about 15°–50° C.

DETAILED DESCRIPTION OF THE INVENTION

Any suitable, effective inorganic support material can be used as component (a) of the catalyst composition, which is mixed with a hydraulic cement, aluminum powder and water. Preferred inorganic support materials are alumina, magnesia, magnesium aluminate ($MgAl_2O_4$), hydrotalcite (described in U.S. Pat. No. 4,902,660), preferably $Mg_{4.5}Al_2(OH)_{13}CO_3.3.5\ H_2O$), silica, titania, zirconia, vanadia (in particular $V_2O_5$) and mixtures thereof. Titania (described in U.S. Pat. No. 4,920,088) is particularly preferred. Generally the surface area (determined by the $BET/N_2$ method; ASTM D3037) of the inorganic support material is in the range of from about 10 to about 300 $m^2/g$. The support material particles can have any suitable shape, such as spherical, trilobal, quadrilobal, cylindrical, irregular (granular) and the like.

Component (b) of the catalyst composition (compounded with a hydraulic cement, aluminum powder and water) is Pt or Pd or a mixture of both noble metals, preferably Pt; while the iron component (c) preferably is substantially iron oxide. Generally, the catalyst composition contains about 0.05–10 weight-% Pt or Pd or (Pt+Pd) and about 0.1–15 weight-% Fe. The preparation of the catalyst composition comprising components (a), (b) and (c) has been described in the U.S. patents cited above in the section entitled "Background of the Invention" and need not be described herein. Generally, the last step in the preparation is a reducing treatment with a reducing gas, in particular CO or $H_2$ or mixtures thereof. The reducing conditions have been described for the various catalyst compositions in the U.S. patents cited above, and preferably comprise a reducing temperature of about 0°–300° C., more preferably with $H_2$.

Any of the well known hydraulic cements can be used in making the composition of matter of this invention. A description of suitable hydraulic cements is contained in Kirk-Othmer "Encyclopedia of Chemical Technology", Third Edition, Volume 5, John Wiley and Sons, 1979, pages 163–193. Particularly preferred are portland cements which contain CaO, $Al_2O_3$ and $SiO_2$ in various combinations, phases and proportions such as Type I, IA, II, IIA, III, IIIA, IV and V portland cements, as defined in ASTM Method C 150-86 (1988 Annual Book of ASTM Standards, Section 4, Volume 04.01, pages 116–120). Particularly preferred is a Type III portland cement which typically contains about 60–65 weight-% CaO, about 20–22 weight-% $SiO_2$, about 4–6 weight-% $Al_2O_3$, about 2–3 weight-% $Fe_2O_3$, about 1–3 weight-% MgO and about 2–3 weight-% $SO_3$ (as sulfate).

Other preferred hydraulic cements are specific portland cements which are used for cementing steel casings of gas and oil wells to the walls of the bore hold and to seal the porous rock formations. These well cements include Class A, B, C, D, E, F, G, H, and J well cements, as defined in API Specification 10, Fourth Edition, Aug. 1, 1988, entitled "Specification for Materials and Testing for Well Cements", of the American Petroleum Institute 1220 L. Street NW, Washington, D.C. 20005. Particularly preferred is a Type H well cement which contains about 48–65 tricalcium silicate ($3CaO-SiO_2$) as the major component, and additionally various amounts of tricalcium aluminate ($3CaO.Al_2O_3$), tetracalcium aluminum ferrite ($4CaO.Al_2O_3.Fe_2O_3$), sulfates of Mg and/or Ca.

Any finely divided aluminum metal particles, herein referred to as "aluminum powder", can be employed in the process of this invention. The Al powder includes Al metal particles which generally have a particle size of about 0.1 to about 5 mm, such as commercially available ACS Reagent grade aluminum powder (available from Eastman Kodak Company, Laboratory and Research Products Division, Rochester, N.Y., or Mallinckrodt Chemicals, St. Louis, Mo.).

Any suitable method of mixing the hydraulic cement, aluminum powder, the catalyst composition containing components (a), (b) and (c), and water can be employed. Generally dry powders of the cement, Al powder and the catalyst composition are dry-blended, and thereafter water is added with stirring. The Al metal powder is substantially converted to aluminum oxide and/or hydroxide which becomes a component of the composition of matter of this invention.

Any suitable weight ratio of the various components can be employed during the mixing step. Generally, the weight ratio of the hydraulic cement to the catalyst composition containing components (a), (b) and (c) is in the range of from about 0.1:1 to about 10:1, preferably about 0.5:1 to about 3:1. Generally, the weight ratio of hydraulic cement to Al metal is in the range of from about 10:1 to about 1000:1, preferably about 20:1 to about 200:1. Generally, the weight ratio of hydraulic cement to water is in the range of from about 0.1:1 to about 20:1, preferably about 0.5:1 to about 4:1. It is within the scope of this invention to have an acid (e.g., $HNO_3$) or a Group IA and/or Group IIA metal hydroxide, e.g., KOH or $Ca(OH)_2$, present during the mixing step (so as to generate more $H_2$ gas during the mixing step).

Optionally, materials which act as inorganic "glues" (such as water glass or water-soluble sodium metal silicate beads) may also be present during mixing; however, this feature is presently not preferred because no significant, consistent advantage has been realized by the presence of Na silicate.

The thorough mixture of the hydraulic cement, the Al metal powder, the catalyst composition and water is then maintained at about 20°–30° C. (room temperature) or, preferably at an elevated temperature (such as 30°–100° C.) for a sufficient time to cause the hydraulic cement to harden, which may require about 0.5 to about 30 hours (depending on the temperature). Simultaneously with the hardening process, or after the hardening process is substantially complete, excess water (i.e., water not bound in the hardening of the cement) is removed from the mixture. Finally, there is obtained a solid, hardened composition comprising (preferably consisting essentially of) (A) hardened hydraulic cement, and (B) the catalyst composition comprising components (a), (b) and (c), with a water content of less than about 2 weight-%, preferably less than 1 weight-% $H_2O$. The hardening process can be carried out in a mold so as to give the hardened composition a desired shape (e.g., one to fit a $CO_2$ laser cavity into which the composition of this invention is placed for catalyzing the recombination of CO and $O_2$ to $CO_2$). It is within the scope of this invention to reduce the hardened composition by treatment with free hydrogen (preferred) or carbon monoxide, preferably for about 0.5–5 hours at about 100°–300° C. This reducing treatment is particularly beneficial when the composition is used as catalyst for the oxidation of carbon monoxide to carbon dioxide.

The solid, hardened composition of matter of this invention can be used as catalytic composition for various reactions, such as oxidation of CO with $O_2$ to $CO_2$, or oxidation of $N_2O$ or NO with $O_2$ to $NO_2$, or oxidation of hydrocarbons (e.g., those contained in the exhaust gases of automobile engines) with $O_2$ to $CO_2$ and $H_2O$, and the like. The presence of the hydraulic cement in the composition of matter of this invention will impart high particle strength and high abrasion resistance, which are desirable properties (especially when "dusting" of the composition is to be avoided, e.g., in laser applications). Preferably, the composition of matter is used in a process for oxidizing CO with free oxygen to $CO_2$, in particular in $CO_2$ lasers.

The process conditions for oxidizing a carbon monoxide containing feed gas are well known and have been described in the U.S. patents cited in the "Background of the Invention" section. The reaction temperature generally is in the range of from about −50° to about 400° C., preferably from about −30° to about 170° C., more preferably from about 10° to about 50° C. The pressure during the oxidation process generally is in the range of from about 1 to about 2,000 psia, more preferably from about 5 to about 20 psia. The volume ratio of CO to $O_2$ in the feed gas can range from about 1:100 to about 100:1, and preferably is in the range of about 1:10 to about 10:1. The volume percentage of CO and the volume percentage of $O_2$ in the feed gas can each be in the range of from about 0.05 to about 50, preferably from about 0.5 to about 3. The gas hourly space velocity (cc feed gas per cc composition of this invention per hour) can be in the range of from about 0.5 to about 10,000, preferably from about 1 to about 1,000.

The feed gas can be formed in any suitable manner, e.g., by mixing CO, $O_2$ and optionally other gases such as $CO_2$, $N_2$, He and the like, such as in a carbon dioxide laser cavity. Or the feed gas can be an exhaust gas from a combustion engine, or it can be air that is to be inhaled by humans and contains undesirable levels of toxic carbon monoxide, and the like. The feed gas can be contacted in any suitable vessel or apparatus, such as in a laser cavity or in an exhaust pipe of a combustion engine, wherein the feed gas passes over the composition of this invention at the conditions described above. The CO oxidation process of this invention can be carried out in any suitable setting and for any purpose, e.g., for recombining CO and $O_2$ in $CO_2$ lasers or, to oxidize CO contained in exhaust gases or air, and the like.

The following examples are presented in further illustration of the invention and are not to be construed as unduly limiting the scope of the invention.

EXAMPLE I

This example illustrates the experimental setup for testing the activity of the composition of this invention for catalyzing the oxidation of carbon monoxide (so as to simulate catalytic recombination of CO and $O_2$ in $CO_2$ lasers). A gaseous feed blend comprising CO, $O_2$, $CO_2$, He and $N_2$ was passed through a needle valve and a glass reactor in an upflow direction. The glass reactor tube had an inner diameter of about 6 mm and generally contained about 1.0 gram catalyst in a bed of about 2.5 cm height. The temperature in the catalyst bed was measured by means of a thermocouple inserted into the top layer of the catalyst bed. The CO content in the reactor effluent was determined by means of a Beckman Model 864 IR analyzer.

All tests were carried out at ambient conditions (about 25° C., 1 atm.). Generally the temperature in the catalyst bed rose to about 30° C. because of the generation of heat during the CO oxidation tests. The feed rate of the gaseous feed stream was about 400 cc/minute. The gaseous feed contained 1.2 volume-% CO, 0.6 volume-% $O_2$, 32 volume-% He, 32 volume-% $CO_2$ and $N_2$ as the balance.

EXAMPLE II

This example illustrates the preparation of various cemented catalyst compositions.

Cemented Catalyst Composition A contained 67 weight-% Type III portland cement (manufactured by Lone Star Industries, Tulsa, Okla.) and 33 weight-% of a catalyst composition consisting essentially of 3 weight-% Pt, 1 weight-% Fe (as iron oxide) and $TiO_2$ as support material (prepared by impregnation of $TiO_2$ with Pt and Fe compounds, followed by calcination and reduction with $H_2$, substantially in accordance with the procedure described in U.S. Pat. No. 4,920,088). Cemented Catalyst Composition A was prepared by mixing (with stirring) 16.0 grams of a Type III portland cement, 8.0 grams of the Pt/Fe/$TiO_2$ catalyst and 12 cc of distilled water. The obtained mixture was cast into pellets in microtiter plates of 0.5 cm diameter and kept at room temperature in a hygrostat for about 2 days.

Cemented Catalyst Composition B was prepared substantially in accordance with the preparation of Composition A except that about 0.4 g aluminum metal powder (about 1 weight-% of the total mixture) was present during the mixing.

Cemented Catalyst Composition C was prepared substantially in accordance with the procedure for Composition B except that the material (in pellet form) was calcined for 2 hours in air after hardening.

EXAMPLE III

This example illustrates the CO oxidation activity of the various cemented catalyst compositions described in Example II. These cemented catalyst compositions were exposed for 2 hours to free hydrogen at 200° C. before they were tested in the CO oxidation reactor. Test results are summarized in Table I.

TABLE I

| Cemented Catalyst Composition | Time (hours) | Conversion of cc CO per Minute per Gram Catalyst |
|---|---|---|
| A (Control) | 1 | 0.70 |
| | 2 | 0.67 |
| | 4 | 0.65 |
| | 6 | 0.64 |
| | 8 | 0.63 |
| | 10 | 0.62 |
| | 15 | 0.59 |
| | 20 | 0.56 |
| B (Invention) | 1 | 1.08 |
| | 2 | 1.02 |
| | 4 | 0.98 |
| | 6 | 0.94 |
| | 8 | 0.92 |
| | 10 | 0.90 |
| | 15 | 0.86 |
| | 20 | 0.83 |
| C (Invention) | 1 | 1.17 |
| | 2 | 1.12 |
| | 4 | 1.07 |
| | 6 | 1.03 |
| | 8 | 1.00 |
| | 10 | 0.97 |
| | 13 | 0.93 |
| | 17 | 0.90 |

Test data in Table I clearly show that Cemented Compositions B and C, which were prepared in the presence of Al powder, were considerably more active as CO oxidation catalysts than Cemented Composition A which was prepared without Al powder.

Additional test data (not included in Table I) showed that a cemented composition comprising a Pt/Fe/$TiO_2$ catalyst composition and a Class H well cement was more active as a CO oxidation catalyst than a cemented composition containing Pt/Fe/$TiO_2$ and a Type III portland cement. Based on these test results, it is concluded that a cemented composition prepared in accordance with the procedure for Cemented Catalyst Compositions B and C but employing a Class H well cement in lieu of Type III portland cement would be more active in the above CO oxidation tests than Cemented Compositions B and C.

Reasonable variations, modifications and adaptations for various usages and conditions can be made within the scope of the disclosure and the appended claims, without departing from the scope of this invention.

That which is claimed is:

1. A process for preparing a solid composition of matter which comprises a mixture of
   (1) a hardened hydraulic cement and
   (2) a catalyst composition comprising (a) an inorganic support material, (b) at least one of platinum and palladium metal, and (c) at least one iron component selected from the group consisting of iron oxide, iron metal and mixtures thereof;

said process comprising the steps of:
   (A) mixing water, a hydraulic cement, aluminum metal powder, and said catalyst composition comprising components (a), (b) and (c), and
   (B) maintaining the mixture obtained in step (A) under such conditions so as to affect hardening of the hydraulic cement, and to substantially dry the mixture of step (A) so as to obtain a substantially dry, solid composition of matter.

2. A process in accordance with claim 1, wherein said hydraulic cement is a Type III portland cement.

3. A process in accordance with claim 1, wherein said hydraulic cement is a Class H well cement.

4. A process in accordance with claim 1, wherein component (a) of said catalyst composition is selected from the group consisting of alumina, magnesia, magnesium aluminate, hydrotalcite, silica, titania, zirconia, vanadia and mixtures thereof.

5. A process in accordance with claim 1, wherein said catalyst composition comprises titania as support material, platinum metal and iron oxide.

6. A process in accordance with claim 5, wherein said hydraulic cement is at least one of Type III portland cement and Class H well cement.

7. A process in accordance with claim 1, wherein in step (A) the weight ratio of said hydraulic cement to said catalyst composition is in the range of about 0.1:1 to about 10:1, the weight ratio of said hydraulic cement to said aluminum metal powder is in the range of about 10:1 to about 1000:1, and the weight ratio of said hydraulic cement to said water is in the range of about 0.1:1 to about 20:1.

8. A process in accordance with claim 1, wherein in step (A) the weight ratio of said hydraulic cement to said catalyst composition is in the range of about 0.5:1 to about 3:1, the weight ratio of said hydraulic cement to said aluminum metal powder is in the range of about 20:1 to about 200:1, and the weight ratio of said hydraulic cement to said water is in the range of about 0.5:1 to about 4:1.

9. A process in accordance with claim 1, wherein additionally at least one metal hydroxide selected from the group consisting of Group IA metal hydroxides and Group IIA metal hydroxides is present in step (A).

10. A process in accordance with claim 1 comprising the additional step of treating the material obtained in step (B) with free hydrogen at about 100°-300° C.

11. A composition of matter prepared by the process of claim 1.

12. A composition of matter in accordance with claim 11, wherein said hydraulic cement is selected from the group consisting of Type III portland cement and Class H well cement.

13. A composition of matter in accordance with claim 11, wherein component (a) of said catalyst composition is selected from the group consisting of alumina, magnesia, magnesium aluminate, hydrotalcite, silica, titania, zirconia, vanadia and mixture thereof.

14. A composition of matter in accordance with claim 11, wherein said catalyst composition comprises titania as support material, platinum metal and iron oxide.

15. A composition of matter in accordance with claim 14, wherein said catalyst composition comprises 0.05-10 weight-% Pt and about 0.1-15 weight-% Fe.

16. A composition in accordance with claim 14, wherein said hydraulic cement is at least one of Type III portland cement and Class H well cement.

17. A composition in accordance with claim 11, wherein the weight ratio of said hydraulic cement to said catalyst composition is in the range of about 0.5:1 to about 3:1, the weight ratio of said hydraulic cement to said aluminum metal powder is in the range of about 20:1 to about 200:1, and the weight ratio of said hydraulic cement to said water is in the range of about 0.5:1 to about 4:1.

18. A composition in accordance with claim 11, wherein additionally at least one metal hydroxide selected from the group consisting of Group IA metal hydroxides and Group IIA metal hydroxides is present in step (A).

19. A composition in accordance with claim 11, having been treated with free hydrogen at about 100°-300° C.

20. A composition of matter in accordance with claim 11, being active as a catalyst for oxidizing CO with $O_2$ to $CO_2$ at about 10°-50° C.

* * * * *